United States Patent [19]
Matsueda

[11] Patent Number: 5,559,775
[45] Date of Patent: Sep. 24, 1996

[54] CLOCK DETECTION DEVICE OF INFORMATION RECORDING/REPRODUCING APPARATUS AND CLOCK DETECTION DEVICE OF INFORMATION RECORDING APPARATUS

[75] Inventor: Akira Matsueda, Tachikawa, Japan

[73] Assignee: Olympus Optical Co., Ltd., Tokyo, Japan

[21] Appl. No.: 119,397

[22] Filed: Sep. 13, 1993

[30] Foreign Application Priority Data

Sep. 14, 1992  [JP]  Japan ................................. 4-245261

[51] Int. Cl.$^6$ ............................................. G11B 7/00
[52] U.S. Cl. .................. 369/47; 369/48; 369/59; 369/124
[58] Field of Search ..................... 369/47, 124, 49, 369/48, 59; 360/51, 36.1, 36.2; 307/269, 480; 235/454; 371/61, 62

[56] References Cited

U.S. PATENT DOCUMENTS

| | | | |
|---|---|---|---|
| 4,918,415 | 4/1990 | Hashimoto et al. | 235/454 |
| 4,949,325 | 8/1990 | Tsuyoshi et al. | 369/49 |
| 4,982,110 | 1/1991 | Yokogawa et al. | 369/48 X |
| 5,062,091 | 10/1991 | Araeda et al. | 369/47 X |
| 5,111,443 | 5/1992 | Yokogawa et al. | 369/54 |
| 5,172,357 | 12/1992 | Taguchi | 369/124 X |

FOREIGN PATENT DOCUMENTS

63-197067  8/1988  Japan.

Primary Examiner—Aristotelis Psitos
Assistant Examiner—Thang V. Tran
Attorney, Agent, or Firm—Armstrong, Westerman, Hattori, McLeland & Naughton

[57] ABSTRACT

A clock detection device, for an information recording/reproducing apparatus, which detects whether or not data is present on a recording medium with the edge of a data reproduction clock, which is obtained by reproducing clock information for use in synchronizing with the data recorded on the recording medium to reproduce data on the medium. A plurality of read-clock generating cell groups for generating reading clocks and write-clock generating cell groups for generating writing clocks are disposed in such a manner that the reading clocks and writing clocks have a phase difference of 90 degrees. Among the write-clock generating cell group, reproduction signals having phases which are different from each other by 180 degrees can be obtained from even-numbered cells and odd-numbered cells. By obtaining the sum of the reproduction signals from the odd-numbered cells and that of the reproduction signals from the even-numbered cell, and by subtracting the two sum signals, a writing clock is obtained.

5 Claims, 15 Drawing Sheets

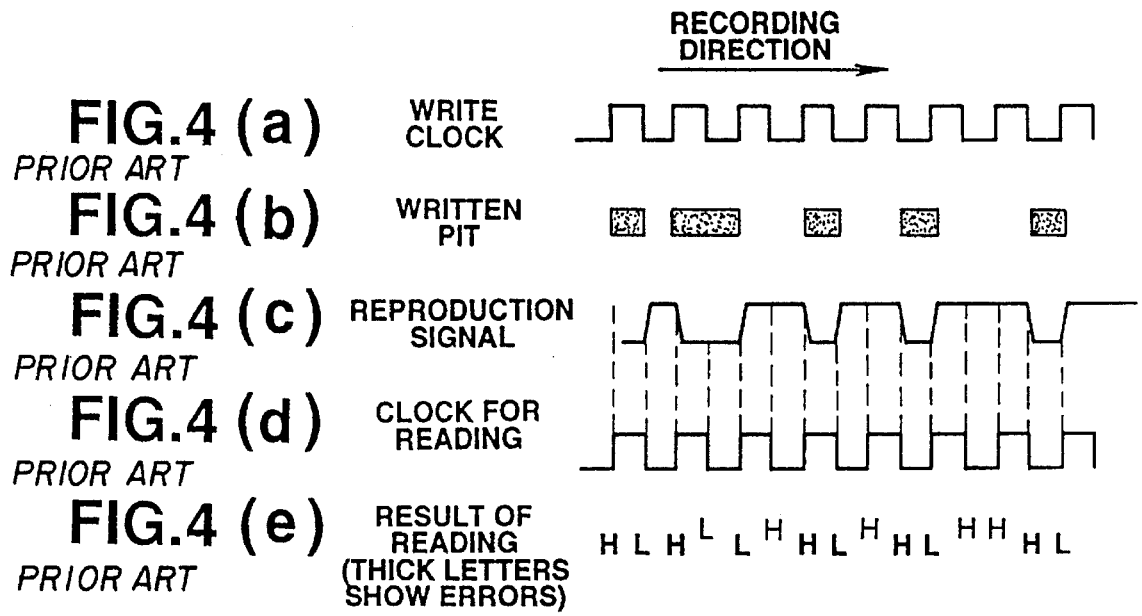
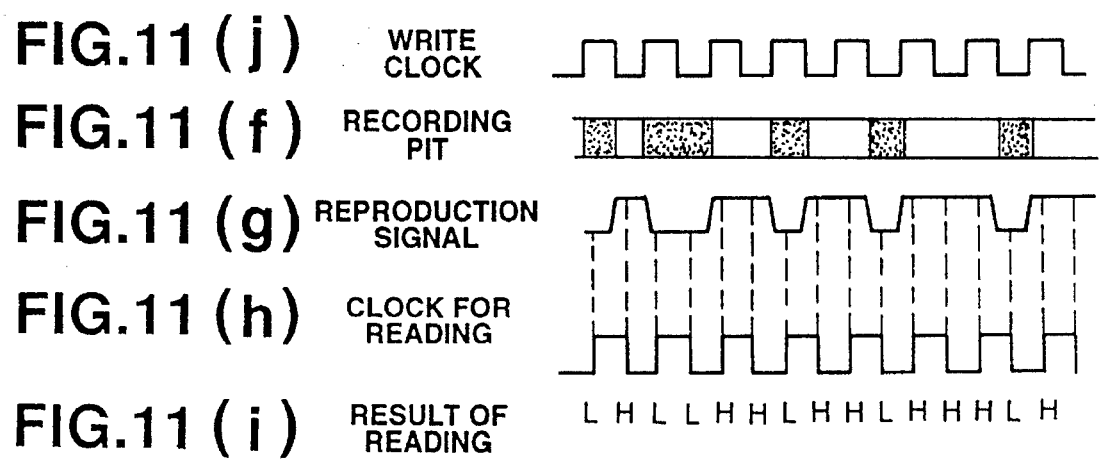

CELL FOR CLOCK
(3 PAIRS FOR READING AND
2 PAIRS FOR WRITING)

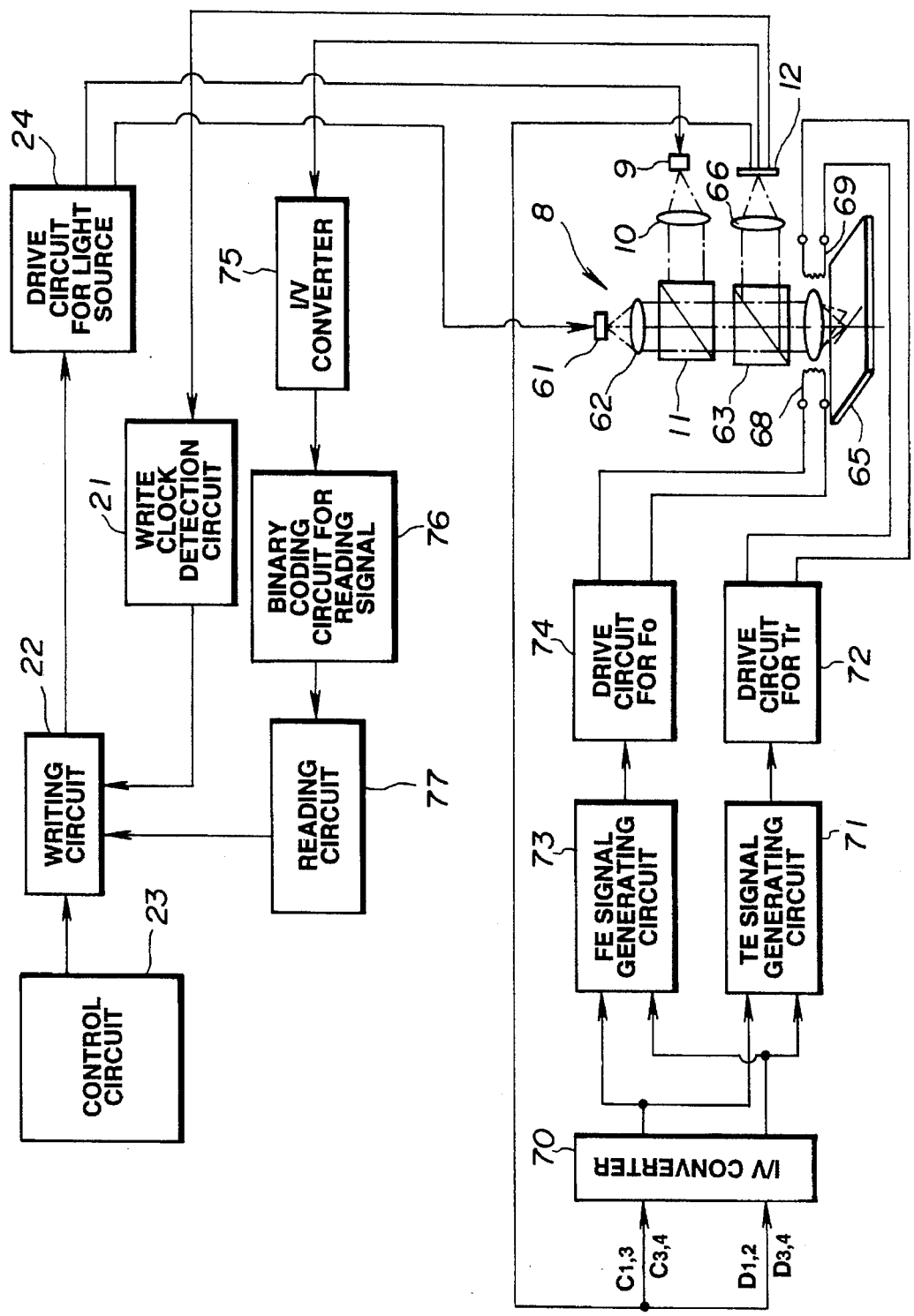

FIG.13
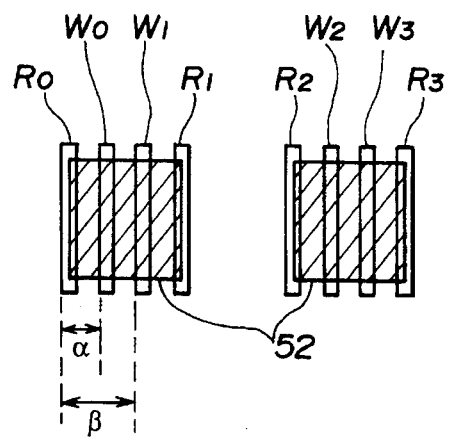
| FIG.14 (a) | READ-WINDOW RW (R1-R0) |
| FIG.14 (b) | W0 |
| FIG.14 (c) | W1 |
| FIG.14 (d) | WRITE-WINDOW WW |
| FIG.14 (e) | RECORDING PIT |
| FIG.14 (f) | REPRODUCTION SIGNAL RS |
| FIG.14 (g) | DETECTION SIGNAL RD |
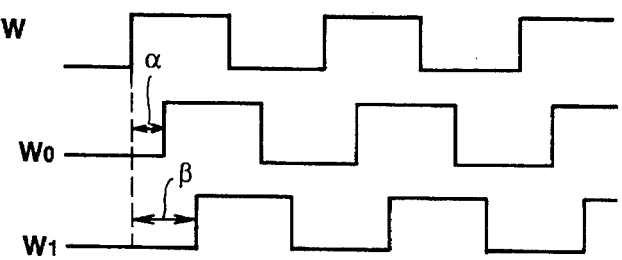

CLOCK DETECTION DEVICE OF INFORMATION RECORDING/REPRODUCING APPARATUS AND CLOCK DETECTION DEVICE OF INFORMATION RECORDING APPARATUS

BACKGROUND OF THE INVENTION

1. Field of the Invention

The present invention relates to a clock detection device of an information recording/reproducing apparatus and a clock detection device of an information recording apparatus adapted to an apparatus for recording/reproducing information to and from a recording medium or an apparatus for recording information and capable of detecting a reproduction clock and a recording clock.

2. Related Art Statement

An optical recording/reproducing apparatus, such as an optical disc, a photomagnetic disc or an optical card, comprises a light source that illuminates an optical recording/reproducing medium (hereinafter called a medium). Further, its non-storage-type detector, such as a silicon photodiode, is used to convert photoelectrically information on the recording medium surface. Then, information is processed so that data is read out. Maintenance of focusing of a reading beam and following to the track are performed in such a manner that an error signal is formed from a detection signal of the foregoing detector and the error signal thus-formed is fed back to an optical head. FIG. 1 illustrates an example of a medium format having an arrangement that data pits 51 and clock pits 52 are recorded together, the medium format being formed by two vertical sections each having 8 data lines with respect to a clock line 53. Sixteen vertical data items are determined by one clock edge. Reference numeral 54 represents a light spot of the reading beam.

FIG. 2 illustrates a state where the surface of the recording medium is projected so that the detection detector is explained. The difference in the reflectance of the data pits 51 is used to indicate "0" or "1" of data, the data being detected by 16 data cells 55 disposed lengthwise. Four cell groups 56 for clocks, each of which is consisting of two cells, are disposed to detect the clocks. The edge of the clock signal reproduced by the cell group 56 serves as the data deterministic timing.

FIG. 3 illustrates the structures of an optical head 60, a detector, a reproducing system and a servo system.

In the optical head 60 shown in FIG. 3, light beams emitted from a light source 61, for example, a light emitting diode (LED), are made to be parallel beams by a collimator lens 62. The light beams, emitted from the light source 61 and allowed to pass through the collimator lens 62, pass through a beam splitter 63, the light beams being then allowed to pass through an objective lens 64 to be applied to a recording medium 65. Light reflected from the recording medium 65 passes through the object lens 64, reflected light bening then reflected by the beam splitter 63, allowed to pass through an imaging lens 66, and introduced into a detector 67. The imaging lens 66 projects an image on the medium surface onto the detector 67.

The detector 67 comprises 16 data cells shown in FIG. 2, the four clock cell groups 56 and servo cells C1 to C4 and D1 to D4. A tracking actuator 68 controls the movement of the object lens 64 in the directions perpendicular to the track to cause the light spot 54 on the surface of the detector 67 to follow the track while preventing a perpendicular deviation from the track. A focusing actuator 69 acts to move the object lens 64 in a vertical direction with respect to the surface of the recording medium 65 to align the focal point of the light spot 54.

The cells C1 to C4 are positioned outside the edge of the optical spot 54 as shown in FIG. 2, while cells D1 to D4 are positioned inside the light spot 54.

The servo system of the apparatus shown in FIG. 3 comprises an I/V conversion circuit 70 for servo cells that converts the output currents from the cells C1 to C4 and D1 to D4 into voltages, a tracking error (TE) signal generating circuit 71, a drive circuit 72 for the track (Tr), a focus error signal generating circuit 73 for receiving a voltage signal supplied from the I/V conversion circuit 70 for the servo cell, and a drive circuit 74 for focusing (FO). The reproduction system of the apparatus comprises an I/V conversion circuit 75 for reading that converts the output currents (reading signals) from the reading cell group 55, a binary coding circuit 76 for binary-coding the reading signals, and a reading circuit 77 for reading data in response to the binary-coded reading signal and a clock signal (omitted from illustration).

The operation of the foregoing apparatus will now be described.

Since the change of the focus position changes the diameter of the beam on the detector surface, the focusing servo detects the foregoing change. Therefore, feeding back, so performed that the difference of the cell disposed at the edge of the beam and shown in FIG. 2 is made to be zero, enables the focusing position to be maintained. Specifically, the focusing servo obtains the difference ($\Sigma C - \Sigma D$) between sum signal $\Sigma C$ of the cells C1 and C4 and sum signal $\Sigma D$ of the cells D1 to D4, the difference being obtained as an error signal to be fed back to the drive actuator for focusing.

The tracking servo is so performed that the clock pit 52 equally corresponds to the cells D1 and D2 and similarly to the cells D3 and D4. Therefore, the track servo feeds back {(D1+D3)−(D2+D4)}, as the error signal, to the drive actuator 68 for tracking.

When data is read, the read-clock is first generated, the read-clock being obtained by binary coding the difference between the sum of even-numbered clock cells 56 and that of the odd-numbered clock cells 56. The 16 data items are respectively binary-coded, and sampled at the edges of the first and last transitions of the clock so that discriminated data items are obtained. Since correction bits are added to the data and both interleaving and modulation are performed, demodulation, deinterleaving and error correction cause reading to be completed.

The following capability can be considered with an information recording/reproducing apparatus of the foregoing type in which the data reading timing of which is determined in accordance with the clock reproduced from the clock line on the medium. That is, if the structure is intended to be capable of both reproducing and recording data, the clock lines on the medium are utilized to serve as the write-clock for determining the recording timing.

With reference to FIG. 4, description will be made about data recording and reproducing operations to be performed when the read-clock from the clock line on the medium surface is used as the write-clock.

In FIG. 4, (a) shows a write-clock for determining the recording timing, the write-clock being generated in accordance with a reading signal obtained from the clock line on the medium. Pits written in synchronization with the write-clock are shown in (b) of FIG. 4. A reproduction signal shown in (c) of FIG. 4 is obtained by reproducing the pits shown in (b) of FIG. 4, the reproducing signal being binary-coded and sampled at the first and last transition edges to be made discriminated data. A reading clock (d) is a clock generated from the same clock line from which the write-clock (a) has been generated. Therefore, the first and last transition positions of the read-clock (d) coincide with the ends of the pits shown in (b) of FIG. 4.

However, the state shown in FIG. 4 is weakest against the phase change of the read-clock (d), and therefore, a slight phase change causes an error to occur in the definition of the reproducing signal. Thick characters in the results of reading (e) indicate errors.

The data detection method shown in FIG. 4 is a method so arranged that edges of the data reproducing clock obtained by reproducing the clock pits recorded on the recording medium are used to detect whether or not data is present on the recording medium. There is another type of information recording/reproducing apparatus adapted to a method that uses a window generated in accordance with clock pits to detect whether or not data is present on the recording medium.

OBJECTS AND SUMMARY OF THE INVENTION

An object of the present invention is to provide a clock detection device that can be adapted to an information recording/reproducing apparatus of a type for detecting whether or not data is present on a recording medium with the edge of a data reproducing clock obtained by reproducing clock information for synchronizing data recorded on the recording medium or an information recording/reproducing apparatus of a type for detecting whether or not data is present on a recording medium by using a data reproduction window obtained in accordance with the clock information, said clock detection device being capable of detecting an adequate data recording clock and a data reproduction clock in accordance with the clock information.

Another object of the present invention is to provide a clock detection device of an information recording/reproducing apparatus that uses clock information for synchronizing data formed on a recording medium to detect a data reproduction clock for use to reproduce information and a data recording clock for use to record information while having no individual writing clock line formed on the recording medium and while preventing a decrease of the recording capacity.

Another object of the present invention is to provide a clock detection device of an information recording apparatus that uses clock information for synchronizing data formed on a recording medium to detect a data reproduction clock for use to detect a track address at the time of recording information and a data recording clock for use to record information while having no individual writing clock line formed on the recording medium and while preventing a decrease of the recording capacity.

Another object of the present invention is to provide a clock detection device of an information recording/reproducing apparatus and a clock detection device of an information recording apparatus which is capable of detecting a data recording clock which is strongest against the phase change of a data reproduction clock for use in reproduction when information is recorded by using a data recording clock generated in accordance with clock information for synchronizing data formed on a recording medium.

Another object of the present invention is to provide a clock detection device of an information recording/reproducing apparatus which is capable of detecting a data recording clock with which lacking of the clock due to dust on the medium and a failure of the medium can be prevented.

Another object of the present invention is to provide a clock detection device of an information recording/reproducing apparatus which is capable of detecting a data recording clock in which noise in a signal transmission system is cancelled.

According to one aspect of the present invention, there is provided a clock detection device of an information recording/reproducing apparatus adapted to an information recording/reproducing apparatus for recording data and reproducing recorded data while reproducing clock information for synchronizing data recorded on a recording medium and arranged to generate a data recording clock for use at the time of recording the data and a data reproduction clock for use at the time of reproducing the data in accordance with the clock information, the clock detection device of an information recording/reproducing apparatus comprising: a detection device for detecting the clock information for the purpose of generating the data reproduction clock; and a detection device disposed at a predetermined distance from the detection device for generating the data reproduction clock for the purpose of causing the data reproduction clock and the data recording clock to have a predetermined phase difference, the detection device being arranged to detect the clock information for the purpose of generating the data recording clock.

Other and further objects, features and advantages of the invention will be appear more fully from the following description.

BRIEF DESCRIPTION OF THE DRAWINGS

FIGS. 4(a–e) are an explanatory view which illustrates the relationship among a writing clock, a recording pit and a reading clock;

FIG. 10 is a block diagram which illustrates an apparatus according to this embodiment;.

FIGS. 11(j–i) are an explanatory view which illustrates the relationship among a writing clock, a recording pit and a reading clock;

FIG. 13 is a configuration view which illustrates the positional relationship between a clock generating cell group and a clock pit according to a second embodiment;

FIGS. 14(a–g) illustrate the waveforms for explaining the operation;

DETAILED DESCRIPTION OF THE PREFERRED EMBODIMENTS

Figure 5:
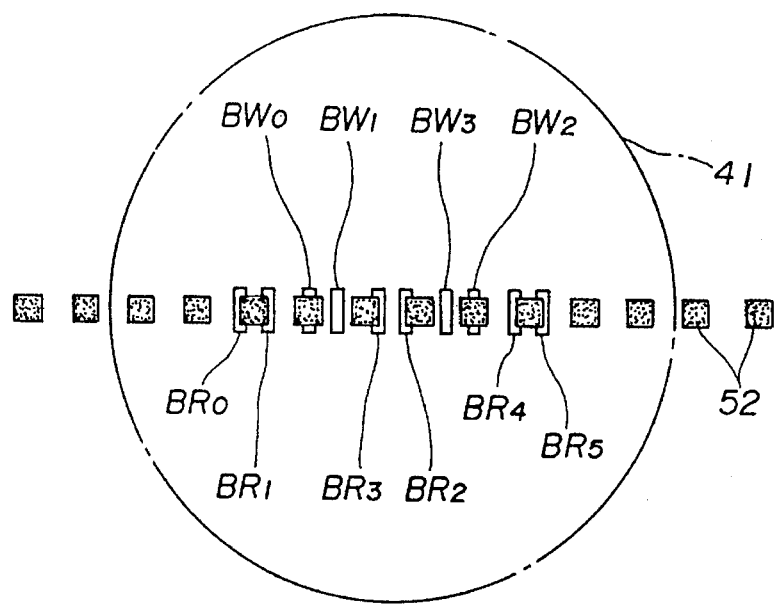
FIG. 5 is a configuration view which illustrates the positional relationship between a clock generating cell group and a clock pit according to a first embodiment.
Figure 6:
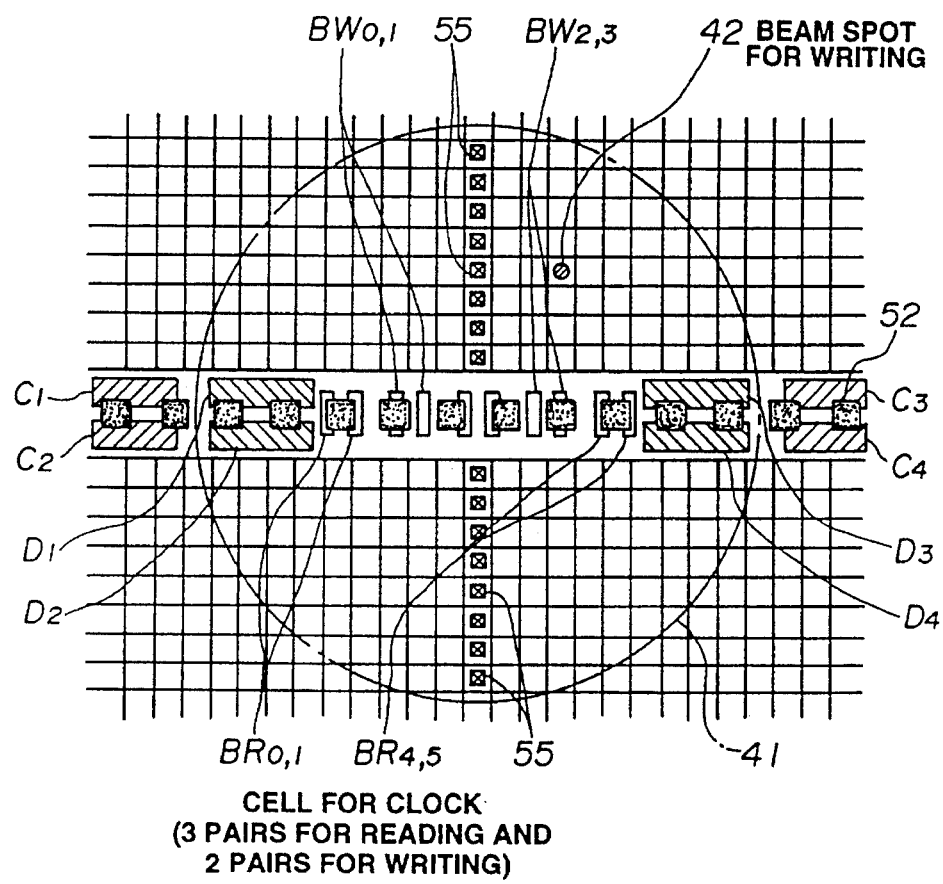
FIG. 6 is an overall configuration view of a cell group on the detector.
Figure 7:
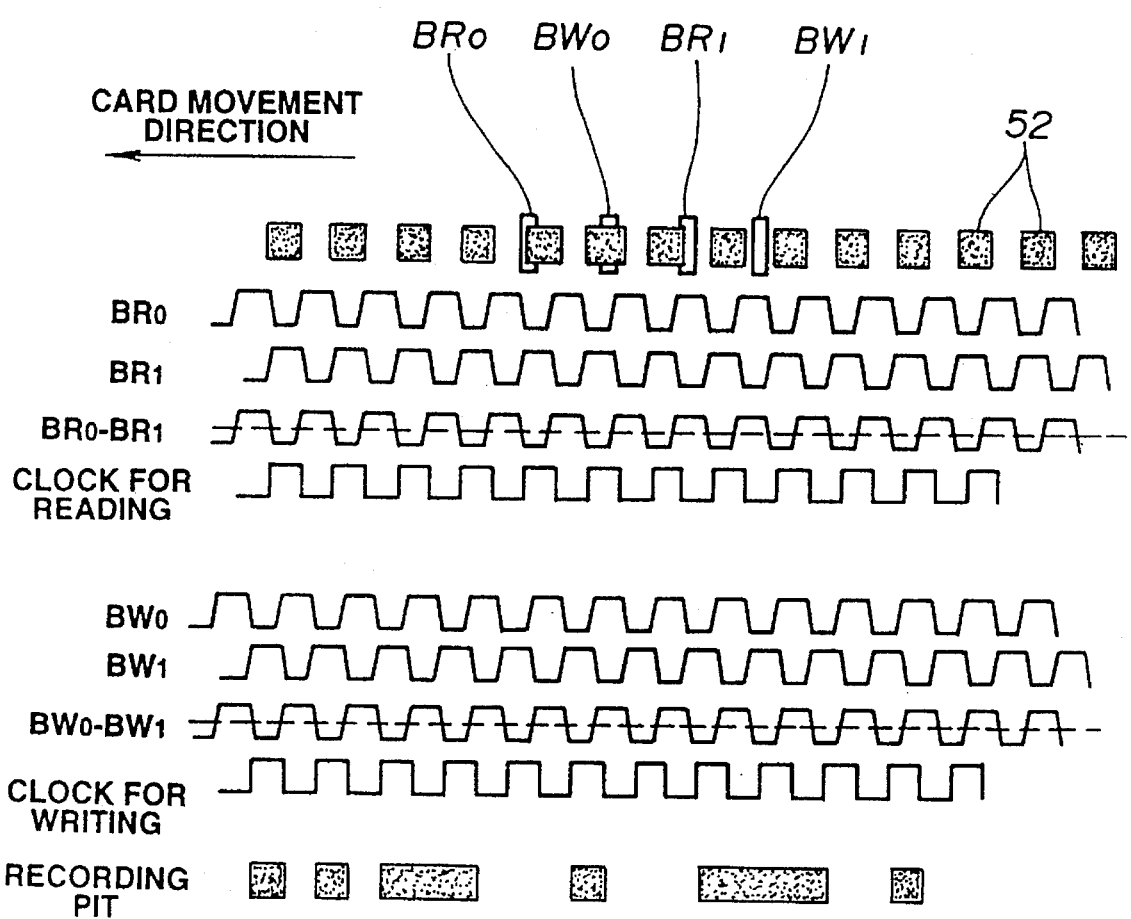
FIG. 7 illustrates the waveforms for explaining the operation.
Figure 8:
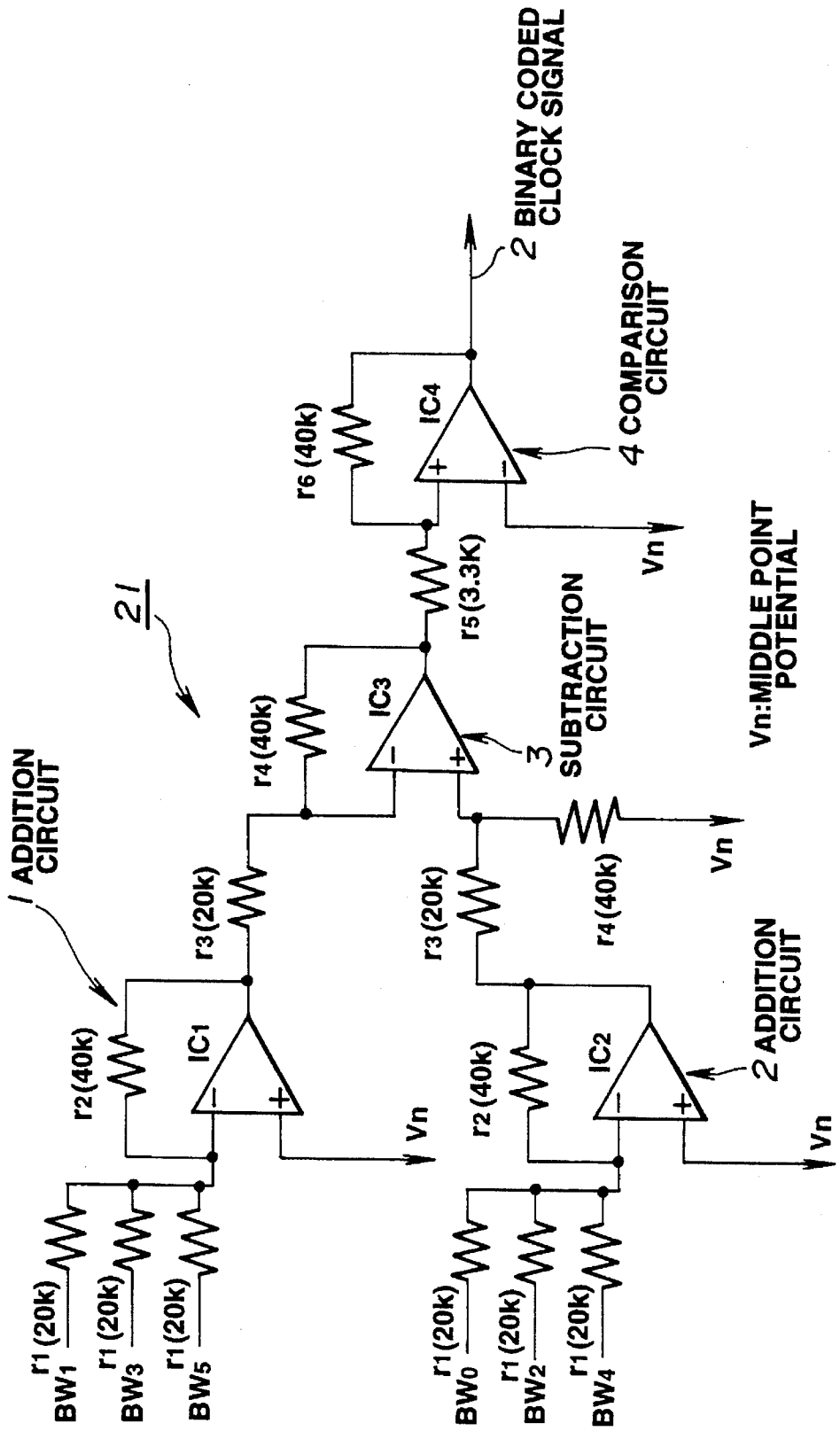
FIG. 8 is a circuit diagram which illustrates a schematic example of a clock detection circuit.
Figure 9:
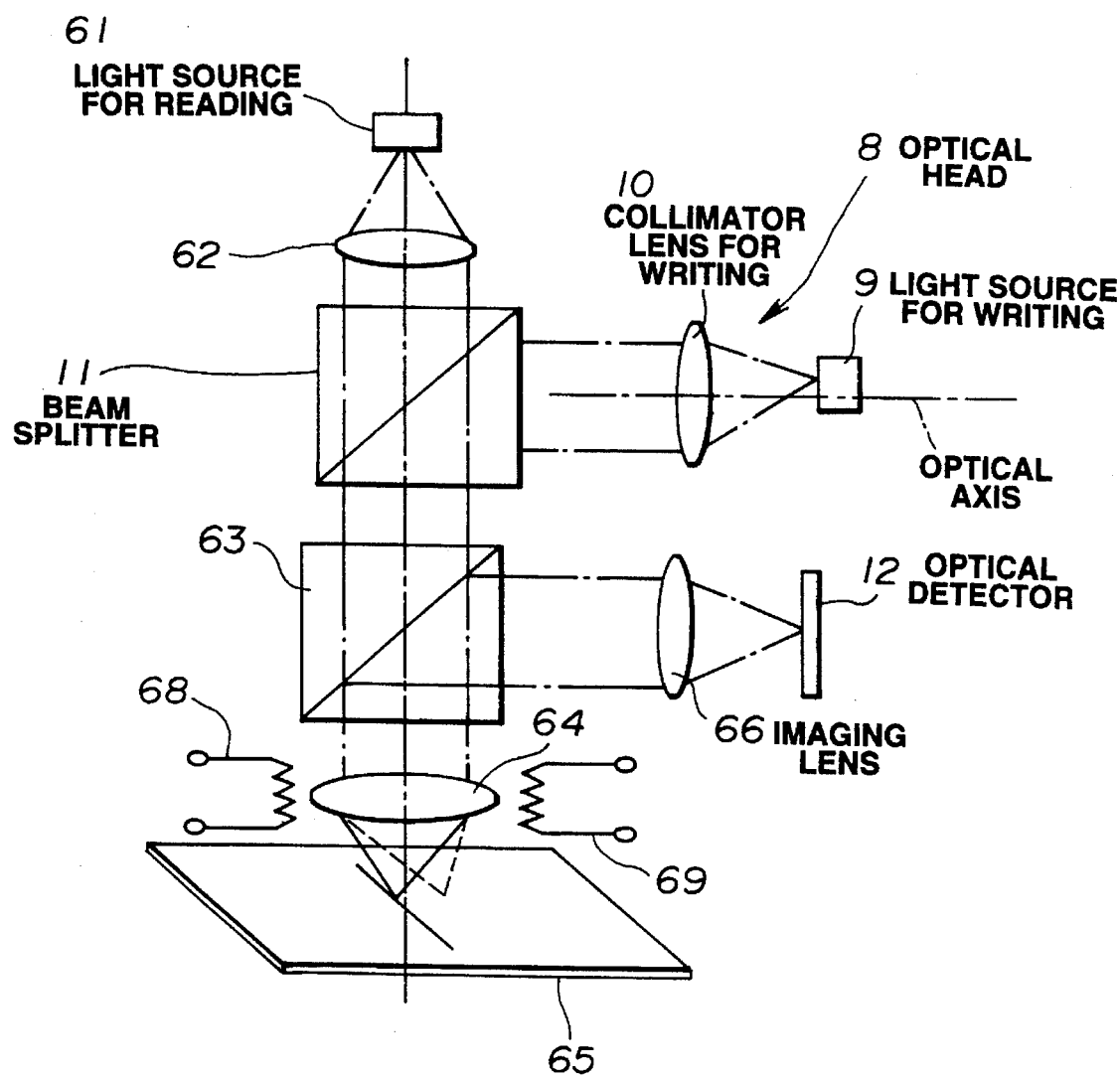
FIG. 9 is a structural view which illustrates the optical system of an optical head.

FIGS. 5 to 11 illustrate a first embodiment of the present invention. FIG. 5 is a configuration view which illustrates the positional relationship between clock generating cell groups and clock pits. FIG. 6 is an overall configuration view which illustrates a detector. FIG. 7 is a waveform view which illustrates the operation. FIG. 8 is a circuit diagram which illustrates a specific example of a clock detection circuit. FIG. 9 is a structural view which illustrates an optical system of an optical head. FIG. 10 is a block diagram which illustrates an apparatus according to this embodiment. FIG. 11 is an explanatory view which illustrates the relationship among write-clock, recording pits and read-clocks.

Figure 3:
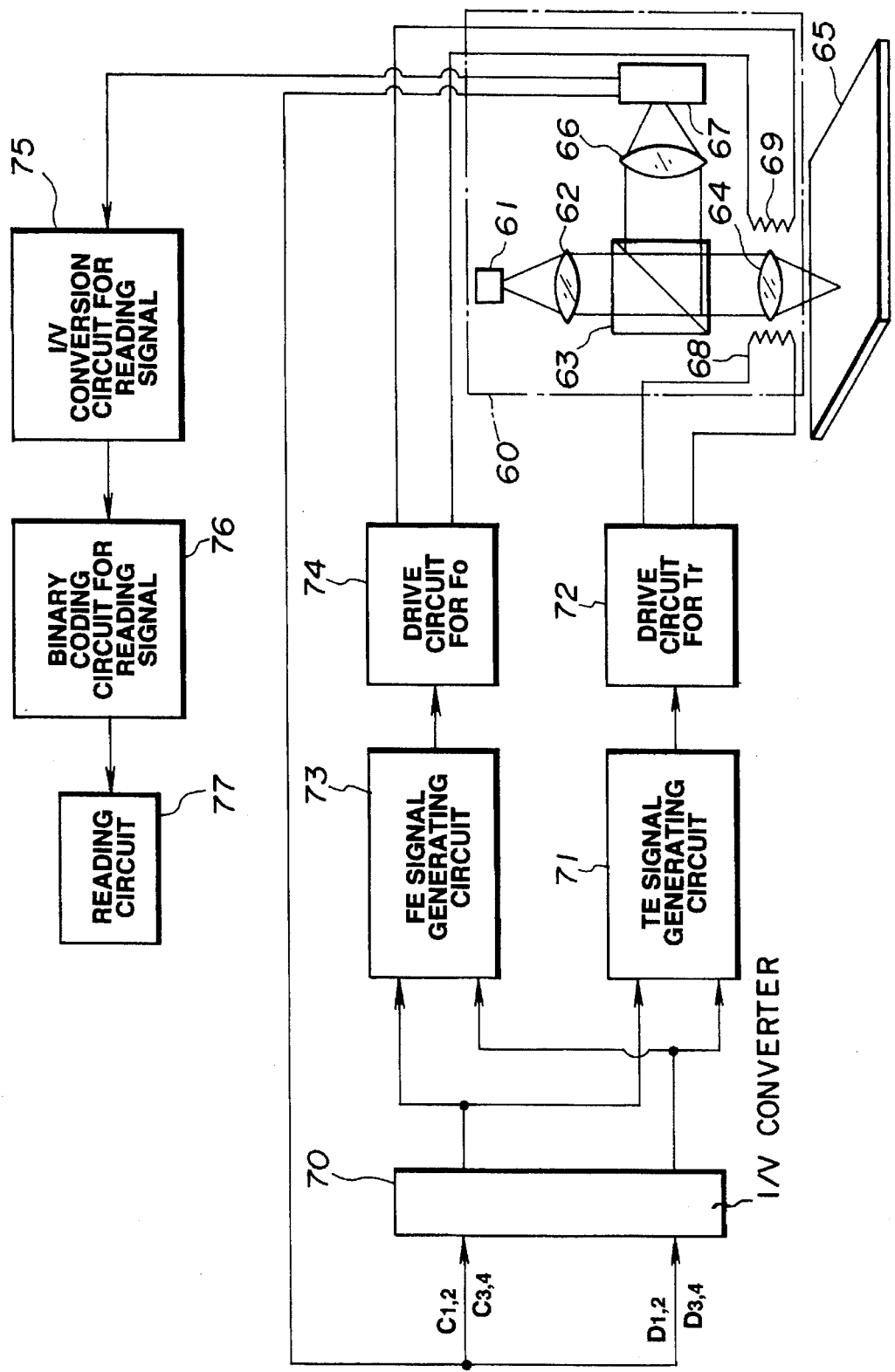
FIG. 3 is a block diagram which illustrates the structures of an optical head, a servo system and a reproduction system according to Related Art.

First, the optical system of the optical head of the information recording/reproducing apparatus is shown in FIG. 9. It should be noted that the same elements and operations of an optical head 8 shown in FIG. 9 as those of the head according to the Related Art shown in FIG. 3 are given the same reference numerals and their descriptions are omitted here.

In addition to the function of the reproducing head according to the Related Art, the optical head of the apparatus according to this embodiment has a function with which information can be recorded on the recording medium. The recording/reproducing optical head 8 comprises a light source 9 for writing, a writing collimator lens 10 for converting light beams emitted from the light source 9 into parallel beams, and a beam splitter 11 for adding the light beams emitted from the light source 61 for reading and the light beams emitted from the light source 9 for writing.

The beam splitter 11 is disposed between the reading collimator lens 62 and the beam splitter 63, the beam splitter 11 being disposed on the optical axis of the apparatus.

The light source 9 for writing is disposed while being set off from the optical axis in order to irradiate a specific line of the recording medium 65 with a light spot.

Writing light beams emitted from the light source 9 are focused on the same plane for the reading light beams while having a predetermined positional relationship with the reading light beams. Therefore, the necessity lies in that only the reading beams are focus and tracking-controlled.

The optical head 8 has an optical detector 12 in place of the optical detector 67 of the reproducing head according to the Related Art.

FIG. 10 is a block diagram which illustrates an optical head and an electric circuit of an information recording/reproducing apparatus. The recording/reproducing apparatus comprises a writing circuit structure in addition to the reading and servo systems of the apparatus shown in FIG. 3. The same structures and operations as those of the apparatus shown in FIG. 3 are given the same reference numerals and their descriptions are omitted here.

The recording/reproducing apparatus has a recording structure that comprises a write-clock detection circuit 21, a writing circuit 22, a control circuit 23 and a light source drive circuit 24 as shown in FIG. 10.

The writing circuit 22 uses a sector mark detection signal recognized in the reading signal supplied from the reading circuit 77 to recognize a fact that shifting has passed through the ID portion of the medium and reached the recording region. The recording/reproducing apparatus shown in FIG. 10 is so arranged that shifting to the desired track, on which data is written, is performed by using a reading signal supplied from the reading circuit 77 to recognize the address of the track in the ID portion as to confirm the track position.

The writing circuit 22 subjects data supplied from the control circuit 23 and to be recorded to interleaving, addition of an error correction code and modulation processes to prepare a data column corresponding to a writing pit column. The writing circuit 22 receives a sector mark detection signal and transmits, to the light source drive circuit 24, a time sequential modulation signal, the one pit period of which ranges between edges of a write-clock, to be described later. The light source drive circuit 24 drives the writing light source 9 with a drive current corresponding to predetermined writing power. The light source drive circuit 24 drives the reading light source 61 with a drive current corresponding to predetermined reading power.

The write-clock detection circuit 21 uses the signal detected by the optical detector 12 to generate a write-clock.

Figure 1:
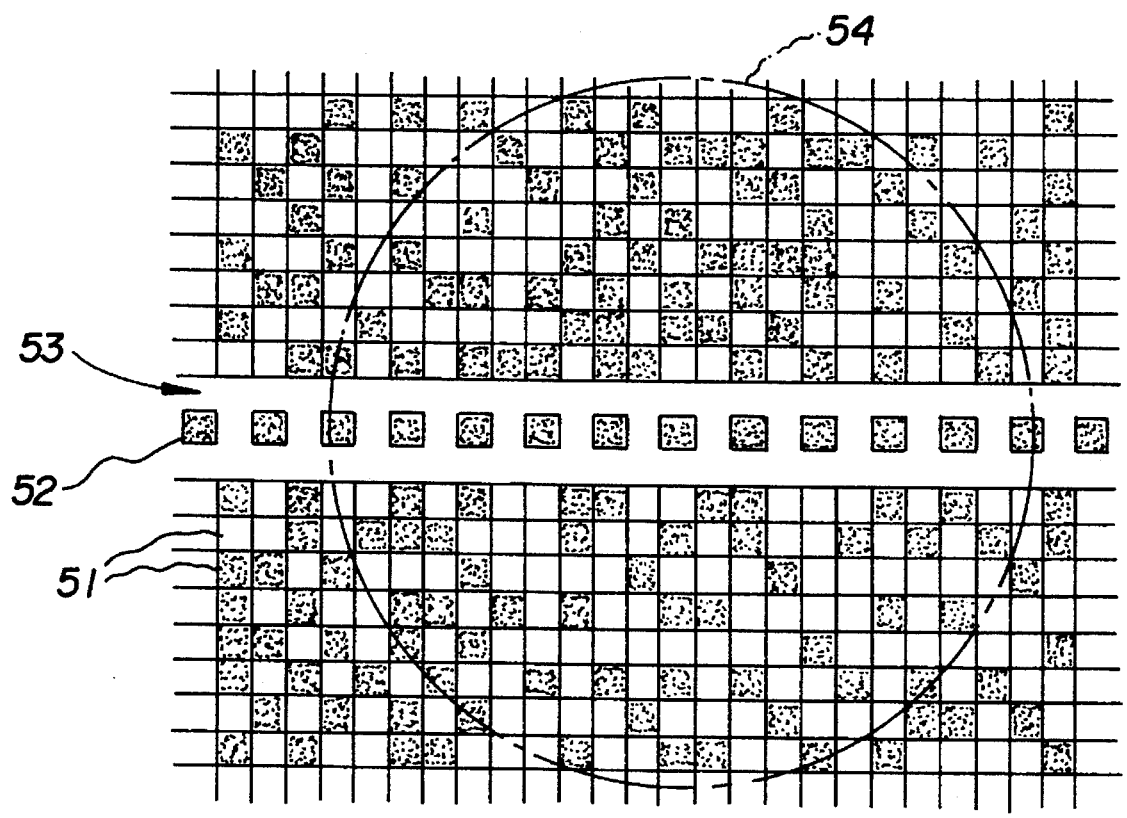
FIG. 1 is an explanatory view which illustrates a format of a recording medium according to Related Art.

The recording medium for use in the information recording/reproducing apparatus is formatted similarly to that shown in FIG. 1. The widths from the clock pits 52 and the pits are made to be the same.

A clock detection device according to this embodiment will now be described. The clock detection device according to this embodiment is arranged to be adapted to the foregoing information recording/reproducing apparatus. The information recording/reproducing apparatus employs a method that samples the reproduction signal with the edge of the reading clock.

The foregoing clock detection device comprises a write-clock generating cell group (to be described later) and a write-clock detection circuit 21, the write-clock generating cell group being disposed in the optical detector 12.

FIG. 11 illustrates the relationship between the read-clock and a pit reproduction signal. In FIG. 11, (j), (f), (g), (h) and (i) respectively represent a write-clock, a recording pit, a pit reproduction signal, a read-clock and the result of reading. The clock detection device according to this embodiment is arranged in such a manner that the first and last transitions of the read-clock and the central portion of the pit substantially coincide with one another. Therefore, the foregoing clock detection device is arranged so that the phase difference between the read-clock and the write-clock is odd-numbered times 90 degrees.

If a time delay occurs in the process performed by the reproduction system or if the relative speed is changed between the medium and the optical head at the time of the reproduction, the phase of the read-clock is changed, and therefore, data cannot sometimes be discriminated accurately. FIG. 11 illustrates a state of the signal in which the probability of the error generation is lowest, that is, a state where the margin is the widest.

FIG. 5 illustrates the positional relationship between the clock pit 52 of the recording medium 65 and a detection device for the clock according to this embodiment. Referring to FIG. 5, reference numerals BR0 to BR5 represent cells in a read-clock generating cell group and BW0 to BW3 represent cells in a write-clock generating cell group. The foregoing cell groups serving as the detection devices for clocks are formed on the optical detector 12.

The read-clock generating cell group consisting of BR0 to BR5 have the same functions as that of the clock detection detector 56 described in Related Art. That is, the read-clock is obtained by binary-coding the analog signal $\Sigma BR2n - \Sigma BR2n+1$ (n=0, 1, 2, ... ,).

On the other hand, the write-clock generating cell group consisting of BW0 to BW3 are disposed so that their phases are deviated from the reading cell group consisting of BR0 to BR5 by 90 angular degrees in the clock period. When the cells BW0 and BW1 are, for example, as shown in FIG. 5, at positions at which the front and rear ends of the clock pit can be detected, the cell BR1 is positioned at an intermediate position between two pits. At any rate, the reproduction signals that can be obtained from the cell group consisting of BW0 to BW3 and the cell group consisting of BR0 to BR5 respectively have phase differences of 90 degrees. The write-clock can be obtained by binary-coding analog signal $\Sigma BW2n - \Sigma BW2n+1$ (n=0, 1, 2).

A specific example of the write-clock detection circuit 21 is shown in FIG. 8.

Referring to FIG. 8, reference numeral 1 represents an addition circuit that adds up the signals from the odd-numbered cells. Reference numeral 2 represents another addition circuit that adds up the signals from the even-numbered cells. Reference numeral 3 represents a subtraction circuit for subtracting the sum of the outputs from the odd-numbered cells supplied from the addition circuit 1 from the sum of the outputs from the even-numbered cells supplied from the addition circuit 2. Reference numeral 4 represents a comparison circuit for, with a threshold value, binary-coding a difference signal supplied from the subtraction circuit 3. It should be noted that a fixed value of intermediate potential Vn is sufficiently large to serve as the threshold value.

Referring to FIG. 8, reference numerals r1 to r6 represent resistors and IC1 to IC4 represent operational amplifiers that constitute the addition circuits 1, 2, the subtraction circuit 3 and the comparison circuit 4. Parenthesized values shown in FIG. 8 are examples of resistor values.

FIG. 7 illustrates the relationship among waveforms of outputs (reproduction signals) from the reading cells, writing cells, the reading clock and the write-clock. For the sake of convenience, FIG. 7 illustrates a structure that has minimum number, in terms of obtaining signals, of read-clock generating cells and write-clock generating cells among all of the disposed plural cell groups. That is, a pair consisting of even and odd cells of the writing cell group and a pair consisting of even and odd cells of the reading cell group are illustrated. For example, BW0, BW1, BR0 and BR1 are employed. However, the clock can be detected by using only one BW cell and one BR cell if the reliability, to be described later, is ignored.

The even-numbered cells and the odd-numbered cells of the writing cell group are disposed in such a manner that the front and rear ends of the edge of the clock pit 52 can be detected. Therefore, the output signals respectively transmitted from BW0 (even-numbered cell) and BW1 (odd-numbered cell) have the phases which are different from each other by 180 degrees. The output signals respectively transmitted from BW0 (even-numbered cell) and BW1 (odd-numbered cell) and passed through the addition circuits 1 and 2 are subjected to process in which their difference is obtained in the subtraction circuit 3 by means of a differential amplification so that a difference signal (BW0−BW1) shown in FIG. 7 is obtained. The difference signal (BW0−BW1) is subjected to a comparison with a predetermined threshold value to be binary-coded, the result of binary-coding being a write-clock shown in FIG. 7. If one BW cell and one BR cell are employed, the addition circuit 1 and 2 can be omitted from the structure.

Also the reading cell group is disposed such that the relationship among the even-numbered cells and the odd-numbered cells has a similar relationship to those of the writing cell group.

Although the clock generating cells are illustrated in a schematic manner in FIG. 7 in order to explain the principle, an assured, that is, a reliable, clock can be obtained by using the sum of the group consisting of the plural cells as shown in FIG. 8. The foregoing structure is formed as a countermeasure taken for the purpose of preventing undesirable lacking of the clock due to dust on the medium or a failure of the medium. That is, the sum of outputs from the group consisting of a plurality of odd-numbered cells and the group consisting of a plurality of even-numbered cells is employed. The reason why the difference between the signals, the phases of which are different from each other by 180 degrees, is calculated is that the noise in the transmission system must be cancelled. The foregoing comparison circuit 4 is arranged so that the first and last transitions have steep wave forms.

Figure 2:
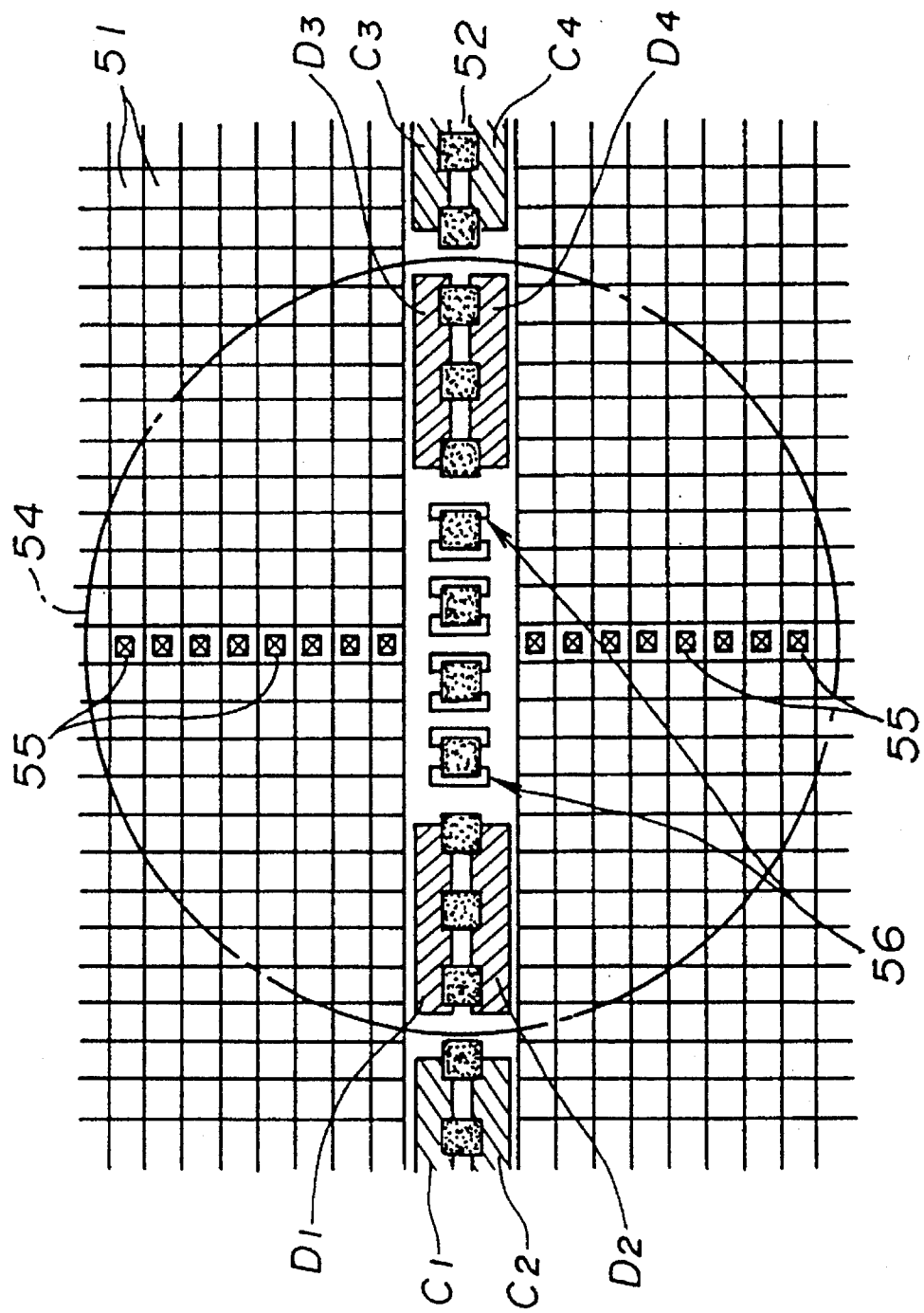
FIG. 2 is an explanatory view which illustrates an optical detector according to Related Art and an image projected to the detector.

FIG. 6 also illustrates other cell groups (servo cells and reading cells) disposed in the optical detector 12 in addition to the cell groups shown in FIG. 5. The structure except for the clock generating cell group shown in FIG. 6 is arranged similarly to that shown in FIG. 2 except for that the lengths of four cells D are shortened in order to obtain the clock cell. The functions of the cells D can be considered to be similar to those shown in FIG. 2. Since the foregoing other cell groups are the same as the cell groups shown in FIG. 2, same reference numerals are given to them and their descriptions are omitted here. Referring to FIG. 6, reference numeral 41 represents a spot image formed by projecting, to the optical detector 12, the reading beam emitted from the optical head 8. Reference numeral 42 represents a spot image formed by projecting, to the optical detector 12, the writing beam emitted from the optical head 8.

Then, pit recording by means of the write-clock thus-detected will now be described.

An example case will now be described in which data is, by a 1 sector/1 track method, recorded on one of 16 lines sectioned into vertical two portions each having 8 lines while interposing the clock. Therefore, the spot 42 of the writing beam is fixed at a specific line position of the medium 65 as shown in FIG. 6. In the foregoing state, recording is performed.

With reference to FIG. 10, description will be made about the recording operation performed by the information recording/reproducing apparatus to which the clock detection device according to this embodiment is adapted.

Similarly to Related Art, the reading beam traces the surface of a needed track. When the reading beam has entered the recording region, the reading circuit 77 recognizes the sector mark in response to the reading signal and transmits the sector mark detection signal to the writing circuit 22. The writing circuit 22 subjects data, previously supplied from the control circuit 23 and to be recorded, to inter-leaving, addition of error correction code and modulation processes to prepare a data column corresponding to the writing pit column. After the sector mark detection signal has been received, the writing circuit 22 transmits, to the light source drive circuit 24, a time sequential modulation signal, the one pit period of which is from the edge of the writing clock transmitted from the write-clock detection circuit 21 to the other edge of the same. The light source drive circuit 24 drives the writing light source 9 with a drive current corresponding to predetermined writing power.

In accordance with the foregoing modulation, a pit is recorded on the medium by the writing beams while standardizing the edge of the write-clock (see (j) and (f) of FIG. 11).

As shown in FIG. 11, the phase of the write-clock and that of the read-clock are deviated from each other by 90 degrees. Therefore, pit (f), the center of which is positioned at the edge of the read-clock (h) as shown in FIG. 11, is recorded.

The clock detection device according to this embodiment is so arranged to have a configuration of the cell group for generating the write-clock and the cell group for generating the read-clock so that a signal in which the data recording clock signal and the recording clock signal have the phase difference, which is odd number times 90 degrees, can be obtained.

Therefore, the information recording/reproducing apparatus, to which the clock detection device according to this embodiment is adapted, is able to record data having no deviation from the read-clock, that is, record a pit, the central portion of which is positioned at the edge of the read-clock. The data thus-recorded is made to be optimally recorded data having the widest margin while making the edge of the read-clock to be the standard, that is, recorded data with which the possibility of occurrence of the error at the time of the reproduction can be made lowest even if the phase of the read-clock is changed.

This embodiment has no individual write-clock line on the recording medium, the recording capacity of the recording medium cannot be reduced, and detection of a write-clock strongest against the phase change of the read-clock at the time of the reproduction can be realized.

The clock detection device according to this embodiment is arranged in such a manner that the odd-numbered cells and the even-numbered cells of groups each consisting of a plurality of cells for generating the write-clock are disposed to generate the reproduction signals having the phases which are different by 180 degrees. Further, the sum signals of the groups consisting of the odd-numbered cells and the even-numbered cells are subtracted so that the binary-coded signal is obtained. Therefore, the clock detection device according to this embodiment is able to prevent undesirable lacking of the clock due to dust on the medium or a failure of the medium, and therefore, noise in the transmission system can be cancelled.

Although this embodiment comprises the three pairs of reading cells and two pairs of writing cells, the present invention is not intended to be limited to this. The number of the pairs can be increased in order to improve the reliability (to prevent lacking) of the clock signal.

Since the reading cell and the writing cell are needed to simply cause their reproduction signals to have a predetermined phase difference, the configuration is needed to be simply disposed relatively deviated from the clock 52. Therefore, the configurations of the reading cells and the writing cells shown in FIG. 5 may be inverted.

Figure 12A:
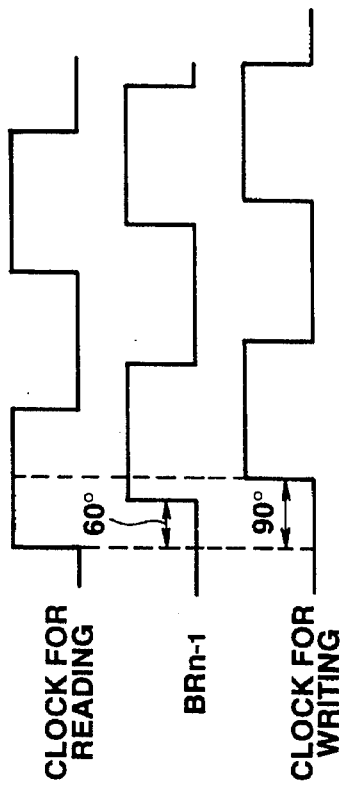
FIGS. 12(a–c) are a structural view which illustrates the configuration of cells and a clock detection circuit according to a modification of the first embodiment.

FIG. 12 is a structural view which illustrates the configuration of the cells and the clock detection circuit according to a modification of the first embodiment.

The positional relationship between the write-clock generating cell group and the read-clock generating cell group according to the first embodiment is not limited to the configuration with which the phase difference is made to be odd number times 90 degrees. The structure of this type may be arranged in such a manner that the phase difference between the generated read-clock and the write-clock is made to be 90 degrees by an electrical process.

This modification is arranged in such a manner that the phase difference is made to be, for example, 60 degrees by disposing write-clock generating cell BRn-1 in the optical detector 12. This embodiment comprises a write-clock detection circuit shown in FIG. 12(b) in place of the write-clock detection circuit 21. The write-clock detection circuit shown in FIG. 12(b) comprises the addition circuit 1, the comparison circuit 4 for binary-coding the output from the addition circuit 1 and a delay circuit 81 for delaying the output from the comparison circuit 4 in a predetermined quantity.

Figure 12C:
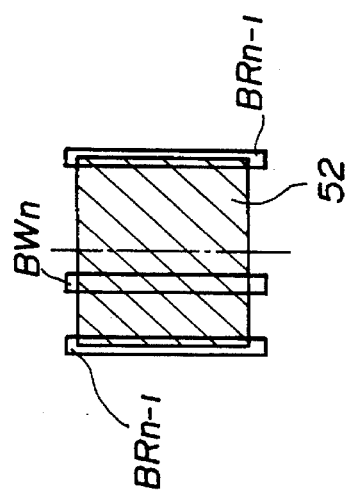
Figure 12B:
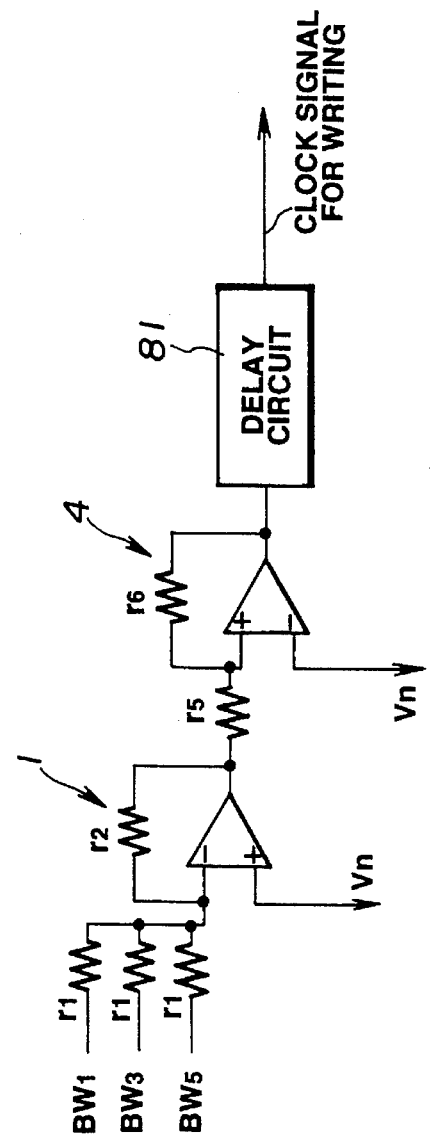

The delay circuit 81 delays to make the phase difference to be, for example, 90 degrees because the phase difference of signal BRn-1 from the read-clock is 60 degrees (see FIG. 12(c)).

The residual structures, operations and effects are the same as those of the first embodiment and the same reference numerals are given the same elements, while omitting their detailed descriptions here.

Figure 15:
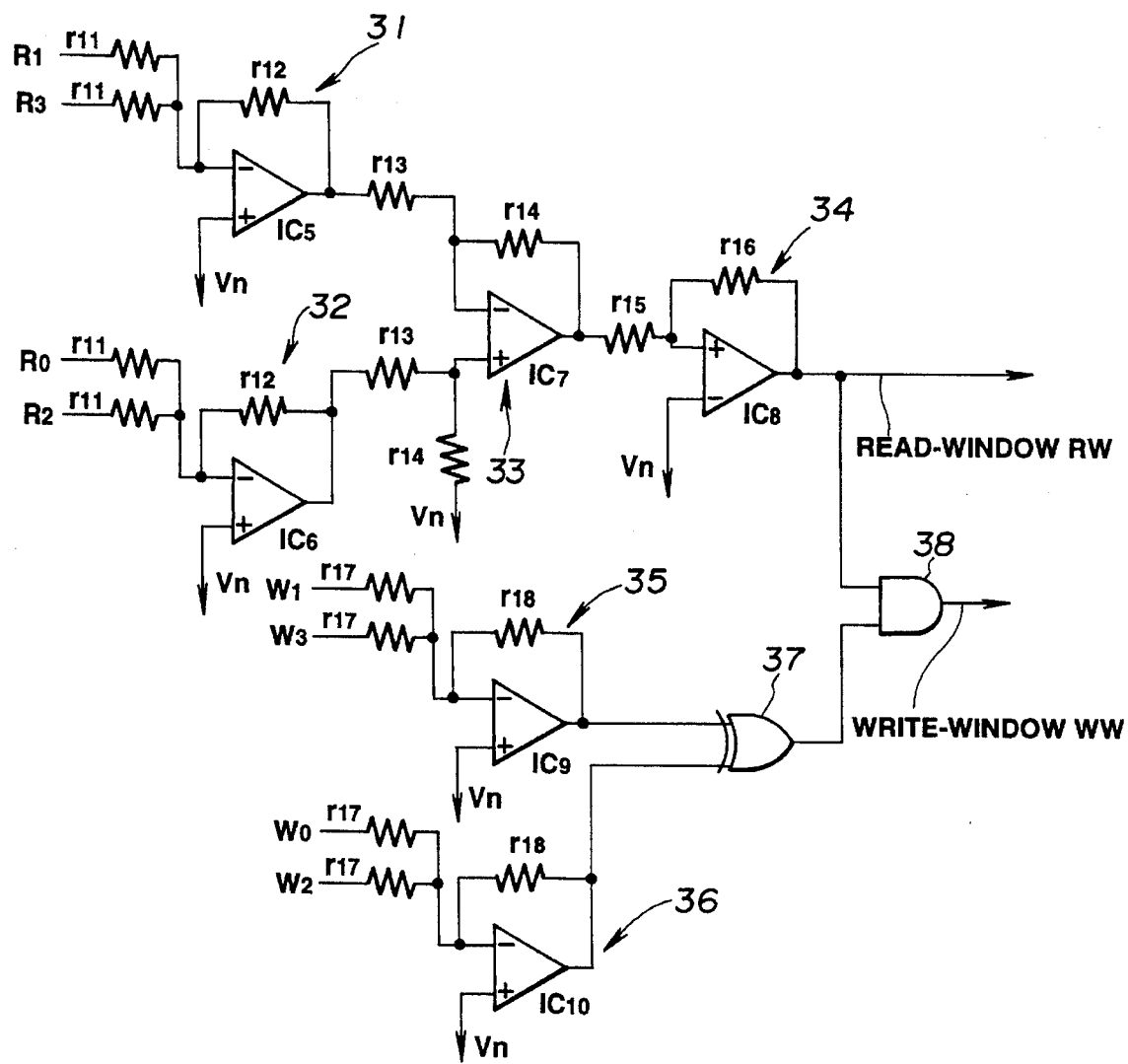
FIG. 15 is a circuit diagram which illustrates a schematic example of a clock detection circuit.

FIGS. 13 to 15 illustrate a second embodiment of the present invention, where FIG. 13 is a configuration view which illustrates the positional relationship between the clock generating cell group and the clock pit according to this embodiment, FIG. 14 is a waveform view which illustrates the operation, and FIG. 15 is a circuit diagram which illustrates a schematic example of the clock detection circuit.

As contrasted with the information recording/reproducing apparatus according to the first embodiment and comprising the clock detection device adapted to the method in which the reproduction signal is sampled with the edges of the read-clock, the clock detection device according to the second embodiment is adapted to a method in which the read-clock is used as a data window to sample the reproduction signal.

In order to sample the reproduction signal while making the read-clock as the data window, this embodiment is arranged in such a manner that the read-clock generating light receiving device and the write-clock generating light receiving device are disposed as shown in FIG. 13.

The cell groups according to this embodiment and shown in FIG. 13 are disposed on the optical detector 12 in place of the cell group consisting of BR0 to BR5 and that consisting of BW0 to BW3. Referring to FIG. 13, reference numerals R0 to R3 represent read-clock generating cells in a group, and W0 to W3 represent write-clock generating cells in a group. The cells in the servo cell group are disposed similarly to those shown in FIG. 6, and the servo-system circuit is arranged similarly to that shown in FIG. 10. Therefore, the foregoing elements are omitted from illustration and their descriptions are omitted here. Since also the optical head and the recording medium are arranged similarly to the head 8 shown in FIG. 9, their descriptions are omitted here.

The read-clock generating cells R0 to R3 of a cell group for generating the read-clock are disposed in such a manner that the edge of the clock pit 52 can be detected. As shown in FIG. 13, the even-numbered cells and the odd-numbered cells of the reading cell group are disposed in such a manner that the front and rear ends of the edge of the clock pit 52 can be detected. In the illustrated structure, the odd-numbered cells R1 and R3 and even-numbered cells R0 and R2 are disposed. The signal transmitted from the odd-numbered cell and that transmitted from the even-numbered cell have the phases which are different from each other by 180 degrees.

Further, two write-clock generating cells are disposed between the even-numbered cell and the odd-numbered cell while being disposed away from each other. In the illustrated example, cells W0 and W1 are disposed between the cells R0 and R1, while cells W2 and W3 are disposed between cells R2 and R3. While making the even-numbered cell among the reading cells to be the standard, the even-numbered writing cell is disposed to make the phase difference to be $\alpha$ and the odd-numbered writing cell is disposed to make the phase difference to be $\beta$. The phase difference $\alpha$ is, for example, 45 degrees, while the phase difference $\beta$ is, for example, 135 degrees.

The writing and reading operations of the information recording/reproducing apparatus to which the clock detection device according to this embodiment is adapted will now be described with reference to FIG. 14. In order to simplify the description, FIG. 14 illustrates the structure comprising the minimum number of cells.

Read-window RW, which is used commonly in the recording and the reproducing operations and shown in FIG. 14(a), can be obtained from the difference between the cell R1 and the cell R0. If the reliability is ignored, use of only one cell, that is, R0 or R1 is sufficient to detect the read-window RW. The outputs from the writing cells W0 and W1 are, as shown in FIG. 14(b) and (c), formed into signals respectively having phase differences $\alpha$ and $\beta$ from the first transition of the read-window RW. The write-window WW for recording shown in FIG. 14(d) is obtained by calculating an exclusive (Ex) OR between the output from the cell W0 and the cell W1 and by obtaining AND between the result of the Ex-OR and the read-window RW. By using the write-window WW, writing of pits shown in FIG. 14(e) is performed.

On the other hand, the AND of reproduction signal RS obtained from the reading cell group 55 and the read-window RW is calculated and discriminated. Detection signal RD thus-obtained and shown in FIG. 14(g) is made to be read data. The reproduction signal RS corresponds to the recording pit, and dust and the like are detected as a signal as shown in FIG. 14(e). By calculating the AND with the read-window RW, data in only a period in which the read-window RW is high is made to be the subject of sampling. Therefore, erroneous detection signals generated due to dust or the like is excluded as shown in FIG. 14(g).

A specific example of a window signal detection signal for detecting the read-window and the write-window is shown in FIG. 15. The window signal detection circuit shown in FIG. 15 is disposed in place of the write-clock detection circuit 21 shown in FIG. 10.

Referring to FIG. 15, reference numeral 31 represents an addition circuit that adds up the outputs from the odd-numbered reading cells. Reference numeral 32 represents another addition circuit that adds up the outputs from the even-numbered reading cells. Reference numeral 33 represents a subtraction circuit for subtracting the sum of Outputs from the odd-numbered cells supplied from the addition circuit 31 from the sum of outputs from the even-numbered cells supplied from the addition circuit 32. Reference numeral 34 represents a comparison circuit that binary-codes the difference signal obtained by the subtraction circuit 33 with a threshold value. It should be noted that a fixed value of intermediate potential Vn is sufficiently large to serve as the threshold value.

The read-window RW is obtained in the clock detection circuit by binary-coding analog signal $\Sigma Rn - \Sigma Rn\text{-}1$ (n=0, 1, 2).

Referring to FIG. 15, reference numeral 35 represents an addition circuit that adds up the outputs from the odd-numbered writing cells. Reference numeral 36 represents another addition circuit that adds up the outputs from the even-numbered writing cells. That is, the addition circuit 35 obtains $\Sigma Rn\text{-}1$, while the addition circuit 36 obtains $\Sigma Rn$ (n=0, 1, 2).

Reference numeral 37 represents an Ex-OR gate that calculates an exclusive OR between the sum of the outputs from the even-numbered cells and the sum of the outputs from the odd-numbered cells. Reference numeral 38 represents an AND gate that calculates the AND of the output from the Ex-OR and the read-window RW. The write-window WW is obtained as the output from the AND gate 38.

Referring to FIG. 15, reference numerals r11 to r18 represent resistors and IC5 to IC10 represent operational amplifiers that constitute the addition circuits 31, 32, 35 and 36, the subtraction circuit 33 and the comparison circuit 34.

In this embodiment, a necessity that the clock pit 52 has the length which is the same as the width between pits can be eliminated. The width of the clock pit 52 may be determined to be adaptable to the needed pulse width of the read-window RW.

Since the residual structures, operations and effects are the same as those of the first embodiment, their descriptions are omitted here.

Figure 16:
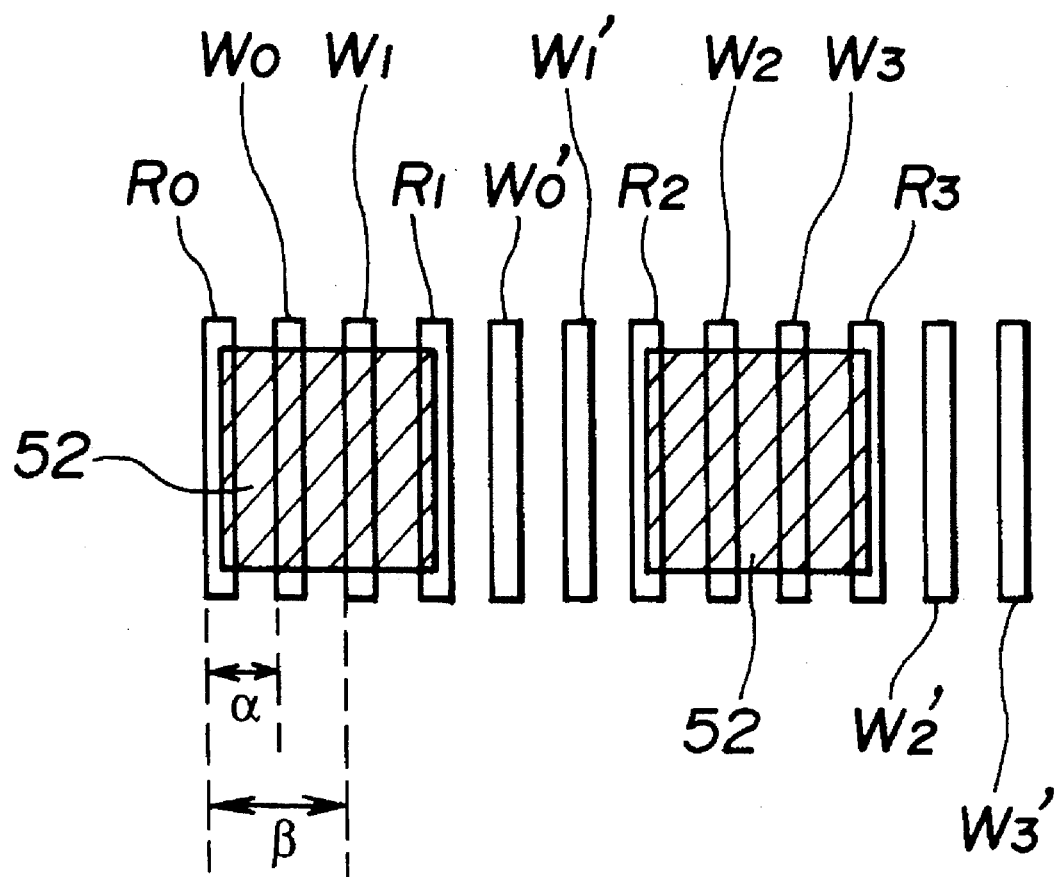
FIG. 16 is a configuration view which illustrates the positional relationship-between a clock generating cell group and a clock pit according to a second embodiment.
Figure 17:
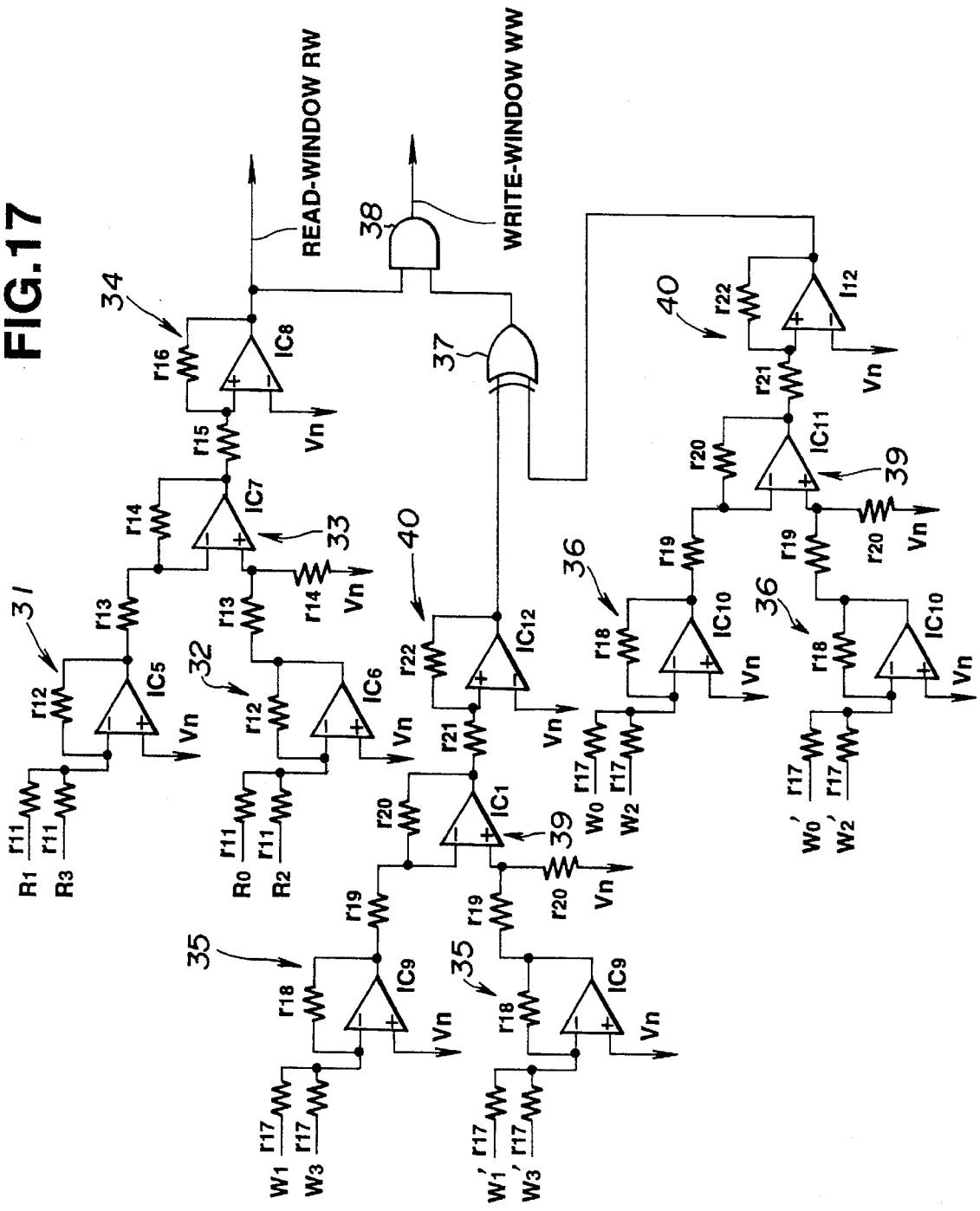
FIG. 17 is a structural view which illustrates a window signal detection circuit.

FIGS. 16 and 17 illustrate a third embodiment, where FIG. 16 is a configuration view which illustrates the positional relationship between the clock generating cell group and the clock pit. FIG. 17 is a structural view which illustrates a window signal detection circuit.

The third embodiment has an arrangement that two writing cells are disposed between the odd-numbered reading cell and the even-numbered reading cell in addition to the cell groups according to the second embodiment. In the illustrated example, cells W'0 and W'1 are disposed between the cells R1 and R2. The writing cells W'0 and W'1 are disposed in such a manner that the phase differences between the detected outputs are made to be $\alpha$ and $\beta$ when the cell R2 is made to be the standard. That is, the cells W'0, W'1 and the cells W0 and W1 are disposed in such a manner that their outputs have the phase difference of 180 degrees. Cells W'2 and W'3 are disposed between the cell R3 and its adjacent clock pit 52 similarly to the foregoing structure.

The window signal generating circuit according to this embodiment is arranged so that two input terminals of the Ex-OR gate 37 receive a signal obtained by binary-coding ($\Sigma Wn - \Sigma W'n$) and that obtained by binary-coding ($\Sigma Wn\text{-}1 - ZW'n\text{-}1$) as shown in FIG. 17, where n is 0, 1 or 2. Referring to FIG. 17, reference numerals 35 and 36 represent addition circuits, 39 represents a subtraction circuit and 40 represents a comparison circuit. Reference numerals r17 to r22 represent resistors, and IC9 to IC12 represent operation amplifiers that constitute the addition circuits, the subtraction circuit and the comparison circuit.

This modification is effective to generate the write-window because lacking of the clock due to dust on the medium and a failure of the medium can be prevented and noise in the transmission system can be cancelled.

In the second and the third embodiments, the positional relationship between the write-clock generating cell group and the read-clock generating cell group may be determined so that the pulse width of the write window, that is, the recording pit is included in the pulse width of the read-window. As a result, whether or not the recording pit is present can be discriminated by using the read-window RW.

By employing the arrangement that the center of the pulse width of the write-window WW is made at the center of the pulse width of the read-window RW, optimum recording data is formed which has the widest margin, that is, with which the possibility of occurrence of an error at the time of the reproduction can be minimized even if the phase of the reading clock is changed.

Since the residual structures, operations and effects are the same as those of the second embodiment, their descriptions are omitted here.

Figure 18:
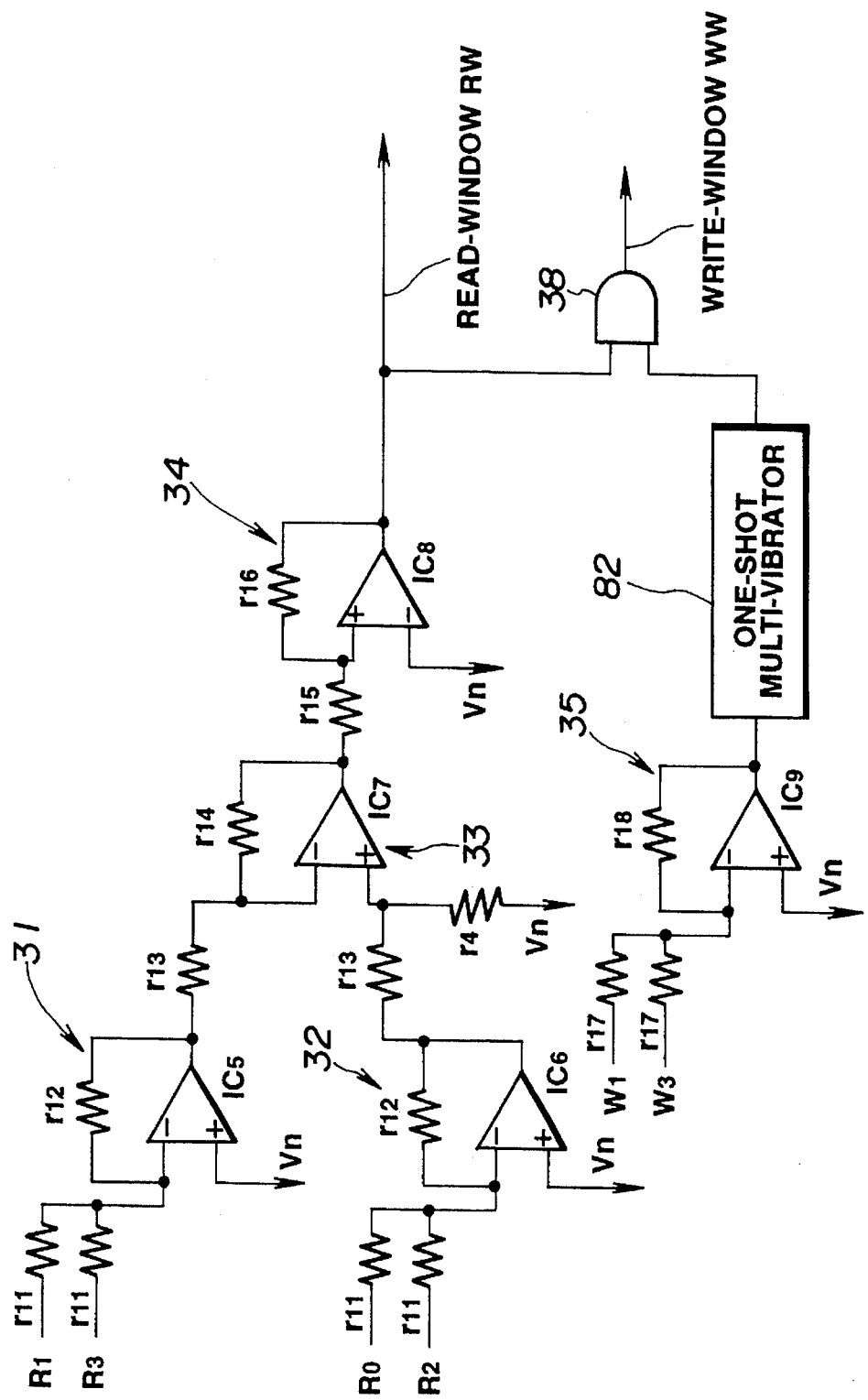
FIG. 18 is a structural view which illustrates a window signal detection circuit according to a modification of the second embodiment.

FIG. 18 is a structural view which illustrates a window signal detection circuit according to a modification of the second embodiment.

The circuit shown in FIG. 18 is arranged in such a manner that the even-numbered writing cells, the addition circuit 36 and the Ex-OR gate 37 of the circuit shown in FIG. 15 are omitted. Further, the circuit shown in FIG. 18 comprises a one-shot multi-vibrator 82 that obtains an output of pulses at a predetermined time width at the first transition timing of the sum of the outputs from the even-numbered writing cells. The foregoing circuit comprises the one-shot multi-vibrator 82 between the output of the addition circuit 35 and either input of the AND gate 38. The one-shot multi-vibrator 82 transmits a signal having a pulse width, the phase difference of which is, for example ($\beta-\alpha$).

Since the other structures, operations and effects are the same as those of the second embodiment, their descriptions are omitted here.

In each of the embodiments, the number of the reading cells and that of the writing cells may be the same or different from each other. From the viewpoint that the influence of the writing error is critical, it might be considered feasible to increase the number of the writing cells.

The necessity of disposing the clock generating cell groups on the same clock line can be eliminated. If a format so designed that a plurality of clock lines are included within the reading beam is employed for example, dispersion of the clock generating cells is effective to prevent lacking of the clock.

The clock detection device according to the present invention may be adapted to a record-only apparatus, a write-enabled apparatus, or a reloadable apparatus. Further, the clock detected by the apparatus according to the present invention may be used to delete recorded data as well as to record data if the apparatus is a write enabled apparatus.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A clock detection device of an information recording/reproducing apparatus adapted to an information recording/reproducing apparatus which detects whether or not data is present on a recording medium with the edge of a data reproduction clock obtained by reproducing clock information for use to synchronize with said data recorded on said recording medium to reproduce data on said medium and which records data while reproducing said clock information and arranged to generate a data recording clock for use at the time of recording said data and a data reproducing clock for use at the time of reproducing said data in accordance with said clock information, said clock detection device of an information recording/reproducing apparatus, comprising;

a first detection device for detecting said clock information and for generating said data reproduction clock; and a second detection device, disposed away from said first detection device, for generating said data recording clock by a predetermined distance so as to cause the phase difference between said data reproduction clock and said data recording clock to be odd number times 90 degrees, said second detection device detecting said clock information for generating said data recording clock.

2. A clock detection device of an information recording/reproducing apparatus according to claim 1, wherein said second detection device for generating said data recording clock is comprised of at least two detection devices for generating data recording clocks, and said at least two detection devices are disposed in such a manner that reproduction signals, obtained by said at least two detection devices as a result of detections of said clock information, have the same phase, said second detection device having means for obtaining the sum of said reproduction signals of said at least two detection devices.

3. A clock detection device of an information recording/reproducing apparatus according to claim 1, wherein said second detection device for generating said data recording clock is comprised of at least two detection device groups for generating data recording clocks, said detection device groups are disposed while being sectioned into two groups so that the phases of reproduction signals from said detection device groups are different from each other by 180 degrees, and said second detection includes:

means for obtaining sum signals of said reproduction signals from each of said two groups that has the same phase, and means for subtracting said sum signal obtained from either of said two detection device groups and having the same phase from said sum signal obtained from a residual detection device group and having the same phase.

4. A clock detection device of an information recording/reproducing apparatus according to claim 3 further comprising comparison means for subjecting a difference signal transmitted from said subtraction means and a predetermined threshold value to a comparison to binary-code said difference signal.

5. A clock detection device of an information recording/reproducing apparatus according to claim 2 further comprising comparison means for subjecting a sum signal transmitted from said means for obtaining said sum and a predetermined threshold value to a comparison to binary-code said sum signal.

* * * * *